(12) United States Patent
Jhang et al.

(10) Patent No.: US 8,995,054 B2
(45) Date of Patent: Mar. 31, 2015

(54) APPARATUS FOR GENERATING PULSE TRAIN WITH ADJUSTABLE TIME INTERVAL

(71) Applicant: Industrial Technology Research Institute, Hsin-Chu (TW)

(72) Inventors: Yao-Wun Jhang, Chiayi (TW); Hsin-Chia Su, Yunlin County (TW); Chien-Ming Huang, Taipei (TW); Shih-Ting Lin, Tainan (TW); Chih-Lin Wang, Tainan (TW); Chieh Hu, Chiayi (TW)

(73) Assignee: Industrial Technology Research Institute, Hsinchu (TW)

( * ) Notice: Subject to any disclaimer, the term of this patent is extended or adjusted under 35 U.S.C. 154(b) by 201 days.

(21) Appl. No.: 13/725,423

(22) Filed: Dec. 21, 2012

(65) Prior Publication Data

US 2014/0153594 A1 Jun. 5, 2014

(30) Foreign Application Priority Data

Nov. 30, 2012 (TW) .............................. 101145023 A

(51) Int. Cl.
| | |
|---|---|
| *B23K 26/06* | (2014.01) |
| *H01S 3/067* | (2006.01) |
| *H01S 3/10* | (2006.01) |
| *H01S 3/08* | (2006.01) |
| *H01S 3/105* | (2006.01) |
| *H01S 3/23* | (2006.01) |

(52) U.S. Cl.
CPC .............. *B23K 26/06* (2013.01); *H01S 3/06791* (2013.01); *H01S 3/08054* (2013.01); *H01S 3/105* (2013.01); *H01S 3/235* (2013.01); *H01S 3/10046* (2013.01)

USPC ............ 359/346; 372/94; 372/6; 372/29.022

(58) Field of Classification Search
CPC ............................. H01S 3/06791; H01S 3/083
USPC ..................... 372/94; 359/346, 349
See application file for complete search history.

(56) References Cited

U.S. PATENT DOCUMENTS 3,740,664 A * 6/1973 Freiberg et al. ................. 372/32
3,825,845 A * 7/1974 Angelbeck et al. ........... 359/349

(Continued)

FOREIGN PATENT DOCUMENTS

| CN | 101617448 A | 12/2009 |
| JP | 2006332666 A | 12/2006 |
| TW | 201201943 A | 1/2012 |

OTHER PUBLICATIONS

Hu et al., "Modeling of multi-burst mode pico-second laser ablation for improved material removal rate", Appl Phys A, pp. 407-415, 2010.

(Continued)

*Primary Examiner* — Ari M Diacou
(74) *Attorney, Agent, or Firm* — Rabin & Berdo, P.C.

(57) ABSTRACT

An apparatus for generating a pulse train with an adjustable time interval is provided. The apparatus, being an annular optical cavity structure, includes a seed source receiving end, a pump source receiving end, an optical coupler, an optical combiner, a gain fiber, an optical path time regulator and a beam splitter. Thus, the apparatus is capable of generating a pulse train with an adjustable time interval to increase material processing quality and speed.

8 Claims, 7 Drawing Sheets

(56) References Cited

U.S. PATENT DOCUMENTS

| | | | |
|---|---|---|---|
| 4,136,929 A * | 1/1979 | Suzaki | 385/30 |
| 4,469,397 A * | 9/1984 | Shaw et al. | 385/27 |
| 4,473,270 A * | 9/1984 | Shaw | 385/30 |
| 4,685,107 A * | 8/1987 | Kafka et al. | 372/6 |
| 4,725,728 A * | 2/1988 | Brininstool et al. | 356/35.5 |
| 4,738,503 A * | 4/1988 | Desurvire et al. | 385/30 |
| 4,972,423 A * | 11/1990 | Alfano et al. | 372/25 |
| 5,126,876 A * | 6/1992 | O'Meara | 359/338 |
| 5,260,954 A * | 11/1993 | Dane et al. | 372/25 |
| 5,359,612 A * | 10/1994 | Dennis et al. | 372/18 |
| 5,566,261 A * | 10/1996 | Hall et al. | 385/27 |
| 5,828,682 A * | 10/1998 | Moores | 372/26 |
| 5,898,716 A * | 4/1999 | Ahn et al. | 372/6 |
| 6,122,097 A * | 9/2000 | Weston et al. | 359/345 |
| 6,292,282 B1 * | 9/2001 | Mossberg et al. | 398/99 |
| 6,356,377 B1 * | 3/2002 | Bishop et al. | 359/290 |
| 6,373,866 B1 * | 4/2002 | Black | 372/16 |
| 6,664,498 B2 | 12/2003 | Forsman et al. | |
| 7,027,217 B2 * | 4/2006 | Kanou | 359/341.3 |
| 7,123,403 B2 * | 10/2006 | Hironishi | 359/337 |
| 7,339,727 B1 * | 3/2008 | Rothenberg et al. | 359/349 |
| 7,394,476 B2 | 7/2008 | Cordingley et al. | |
| 7,397,600 B2 * | 7/2008 | Yu | 359/341.1 |
| 7,477,664 B2 * | 1/2009 | Liu | 372/6 |
| 7,477,666 B2 * | 1/2009 | Liu | 372/6 |
| 7,561,605 B1 * | 7/2009 | Delfyett et al. | 372/25 |
| 7,768,699 B2 * | 8/2010 | Suzuki et al. | 359/337.22 |
| 7,876,803 B1 * | 1/2011 | Di Teodoro et al. | 372/94 |
| 7,884,997 B2 * | 2/2011 | Goodno | 359/349 |
| 7,916,387 B2 * | 3/2011 | Schmitt | 359/344 |
| 7,940,817 B2 | 5/2011 | Okhotnikov et al. | |
| 8,036,537 B2 * | 10/2011 | Cai | 398/179 |
| 8,040,927 B2 * | 10/2011 | Chang et al. | 372/6 |
| 8,054,537 B2 * | 11/2011 | Okuno | 359/327 |
| 8,107,167 B2 * | 1/2012 | Galvanauskas et al. | 359/583 |
| 8,139,910 B2 * | 3/2012 | Stadler et al. | 385/37 |
| 8,160,113 B2 | 4/2012 | Adams et al. | |
| 8,199,398 B2 * | 6/2012 | Fermann et al. | 359/341.1 |
| 8,233,807 B2 * | 7/2012 | Cai | 398/180 |
| 8,265,117 B2 * | 9/2012 | Govorkov et al. | 372/55 |
| 8,270,067 B1 * | 9/2012 | Hsieh et al. | 359/325 |
| 8,340,141 B2 * | 12/2012 | Chang et al. | 372/6 |
| 8,391,323 B2 * | 3/2013 | Takenaga | 372/6 |
| 8,427,769 B1 * | 4/2013 | Stultz | 359/885 |
| 8,675,708 B2 * | 3/2014 | Honda et al. | 372/94 |
| 2001/0017727 A1 * | 8/2001 | Sucha et al. | 359/326 |
| 2003/0174379 A1 * | 9/2003 | Gupta | 359/278 |
| 2003/0218757 A1 * | 11/2003 | Hill | 356/500 |
| 2004/0190119 A1 * | 9/2004 | Tauser et al. | 359/333 |
| 2004/0207905 A1 * | 10/2004 | Tauser et al. | 359/333 |
| 2005/0169324 A1 * | 8/2005 | Ilday et al. | 372/18 |
| 2005/0225846 A1 * | 10/2005 | Nati et al. | 359/341.1 |
| 2005/0254533 A1 * | 11/2005 | Hollemann et al. | 372/25 |
| 2006/0007978 A1 * | 1/2006 | Govorkov et al. | 372/55 |
| 2006/0056480 A1 * | 3/2006 | Mielke et al. | 372/94 |
| 2008/0175279 A1 * | 7/2008 | Kakui | 372/10 |
| 2009/0003391 A1 * | 1/2009 | Li | 372/6 |
| 2009/0067018 A1 * | 3/2009 | Pu et al. | 359/1 |
| 2010/0034221 A1 * | 2/2010 | Dragic | 372/6 |
| 2010/0177794 A1 | 7/2010 | Peng et al. | |
| 2010/0225897 A1 * | 9/2010 | Fermann et al. | 356/51 |
| 2010/0329288 A1 * | 12/2010 | Kitabayashi | 372/6 |
| 2011/0122895 A1 * | 5/2011 | Savage-Leuchs et al. | 372/10 |
| 2011/0158265 A1 * | 6/2011 | Chang et al. | 372/6 |
| 2011/0188850 A1 * | 8/2011 | Mikami et al. | 398/25 |
| 2011/0286474 A1 * | 11/2011 | Takenaga | 372/3 |
| 2012/0127464 A1 * | 5/2012 | Oigawa et al. | 356/301 |

OTHER PUBLICATIONS

Desbiens et al., "Arbitrarily-shaped bursts of picosecond pulses from a fiber laser source for high-throughput applications", Proc. of SPIE vol. 7914, pp. 1-9, 2011.

Hendow et al., "Dynamic Pulsing of a MOPA Fiber Laser for Enhanced Material Processing", Proc. of SPIE vol. 7914, pp. 1-6.

Knappe et al., "Scaling ablation rates for picosecond lasers using burst micromachining", Proc. of SPIE vol. 7585, pp. 1-6, 2010.

Harzic et al., "Processing of metals by double pulses with short laser pulses", Appl. Phys. pp. 1121-1125, 2005.

Taiwan Patent Office, Office Action, Patent Application Serial No. TW101145023, Aug. 6, 2014, Taiwan.

\* cited by examiner

APPARATUS FOR GENERATING PULSE TRAIN WITH ADJUSTABLE TIME INTERVAL

CROSS REFERENCE TO RELATED APPLICATION

This application also claims priority to Taiwan Patent Application No. 101145023 filed in the Taiwan Patent Office on Nov. 30, 2012, the entire content of which is incorporated herein by reference.

BACKGROUND

1. Technical Field

The disclosed embodiments relate in general to an apparatus for generating a pulse train, and more particularly to an apparatus for generating a pulse train with an adjustable time interval.

2. Description of the Related Art

In the prior art, a picosecond laser adopted in material micromachining comes in a picosecond laser with single pulse, as shown in FIG. 1A, or a picosecond laser with pulse train having an unadjustable time interval, as shown in FIG. 2A. Under a same amount of laser energy, compared to a drilling depth of the picosecond laser with single pulse shown in FIG. 1B, a picosecond laser with pulse train has a greater depth as shown in FIG. 2B. Referring to FIG. 1C, the picosecond laser with pulse train hence offers preferred surface processing effects. In the prior art, in addition to necessary signal synchronization and delay control, a conventional mechanism for generating the picosecond laser with pulse train is also complex in structure and high in cost as well as having an unadjustable pulse train time interval. FIG. 4 shows a state change of a material during a laser process, where the horizontal axis represents a material density and the vertical axis represents a material temperature. After being processed by a laser, the material enters a liquid phase from a solid phase, and then enters a gas phase. If the time interval of the pulse train is too long, a cutting amount is lowered when the material is cooled to below a critical point after the laser process, as shown in FIG. 5. In FIG. 5, the horizontal axis represents the time interval of the pulse train, and the vertical axis represents the cutting amount. As the cutting amount at the vertical axis decreases as the time interval at the horizontal axis increases, it is concluded that the time interval cannot be too long. Referring to FIG. 6, if the time interval of the pulse train is too short, plasma shielding effects are generated after the laser process. In FIG. 6, the horizontal axis represents the time. An area of plasma shielding generated due to an inadequate time interval blocks a next laser pulse when the material is still in the liquid phase after the laser process, signifying that the time interval of the pulse train cannot be too short, either. Further, time intervals of pulse trains for different materials may also be different. Therefore, the time interval is a critical processing parameter for laser pulse trains. In a conventional method for generating a picosecond laser with pulse train, from a high repetition rate laser pulse optical source, an electrically-controlled high-speed optical pulse picker selects a desired pulse train shape. However, such method limits the time interval between the pulse trains as the interval is unadjustable.

SUMMARY

The disclosure is directed to an apparatus for generating a pulse train with an adjustable time interval. In addition to providing superiorities of pulse trains, the apparatus further has a structure for controlling the time interval of a pulse train to generate a pulse train with an adjustable time interval, thereby satisfying process requirements for different materials.

The apparatus for generating a pulse train with an adjustable time interval offers preferred drilling depth and material surface processing quality compared to a picosecond laser with single pulse. More specifically, compared to a conventional picosecond laser with single pulse, a pulse train with an adjustable time interval generated by the apparatus of the embodiments renders not only a greater drilling depth but also preferred quality as no burr is produced by the material surface processing as well as a faster processing speed.

According to one embodiment, an apparatus for generating a pulse train with an adjustable time interval is provided. The apparatus, being an annular optical cavity structure, comprises: an optical coupler, having an input end as a first end serving as a seed source receiving end for receiving a seed source optical signal inputted, and another input end as a second end for cyclically transmitting the seed source optical signal within the annular optical cavity; an optical combiner, having an input end as a fourth end connected to an output end of the optical coupler as a third end, and another input end as a fifth end serving as a pump source receiving end for receiving a pump source optical signal inputted; at least one gain fiber, being a gain medium, located on the annular optical cavity structure, having at least one input end connected to an output end of the optical combiner as a sixth end, for amplifying a pulse train optical signal cycling within the annular optical cavity structure; an optical path time regulator, having an input end as a seventh end connected to an output end of the at least gain fiber, for adjusting the time interval between the pulse train of optical signals within the annular optical cavity; and a beam splitter, having an input end as a ninth end connected to an output end of the optical path time regulator as an eighth end, and a second output end as an eleventh end connected to the second end (input end) of the optical coupler, such that a part of the seed source optical signals traveling for one cycle within the annular optical cavity are outputted via a first output end of the beam splitter as a tenth end.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Figure 1A:
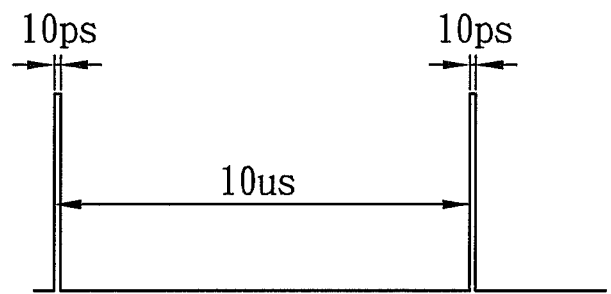
FIG. 1A is a schematic diagram of a picosecond laser with single pulse.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Figure 1B:
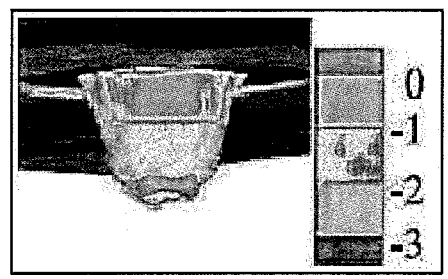
FIG. 1B is a schematic diagram of drilling depth of a picosecond laser with single pulse.
Figure 1C:
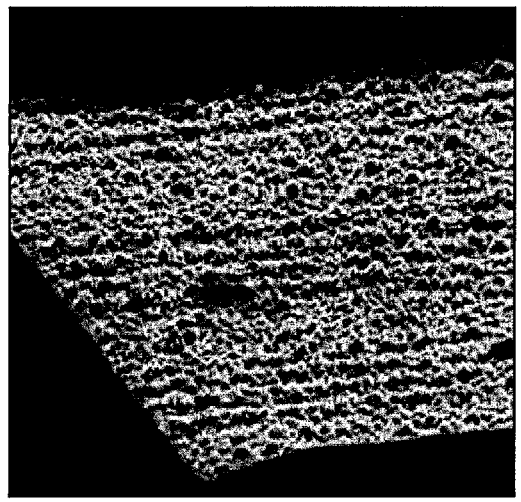
FIG. 1C is a schematic diagram of surface processing of a picosecond laser with single pulse.
Figure 2A:
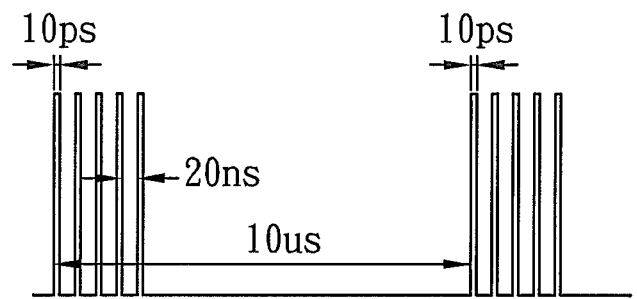
FIG. 2A is a schematic diagram of a picosecond laser with pulse train.
Figure 2B:
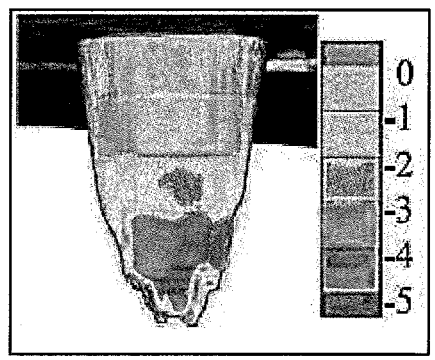
FIG. 2B is a schematic diagram of drilling depth of a picosecond laser with pulse train.
Figure 2C:
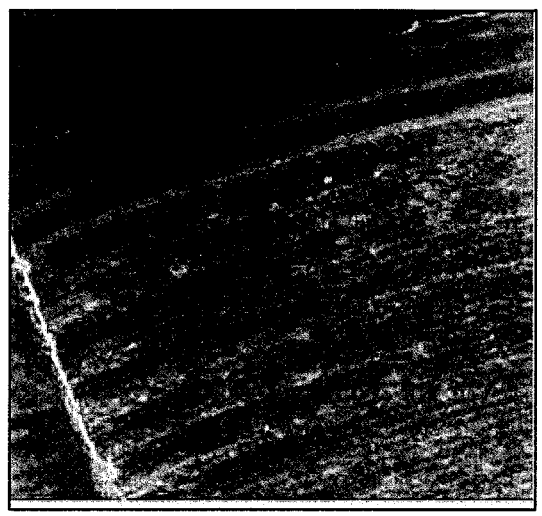
FIG. 2C is a schematic diagram of surface processing of a picosecond laser with pulse train.
Figure 3:
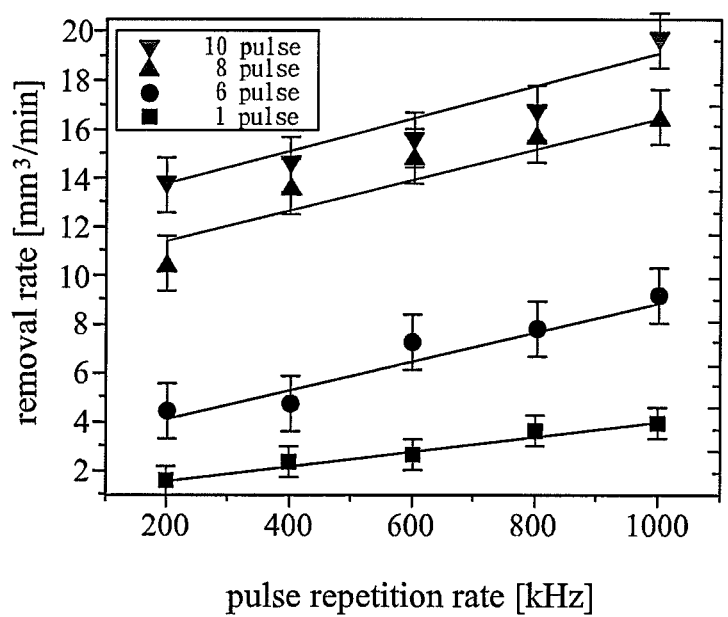
FIG. 3 is a diagram of a relationship between the number of pulse trains and a removal rate under a same laser repetition rate.
Figure 4:
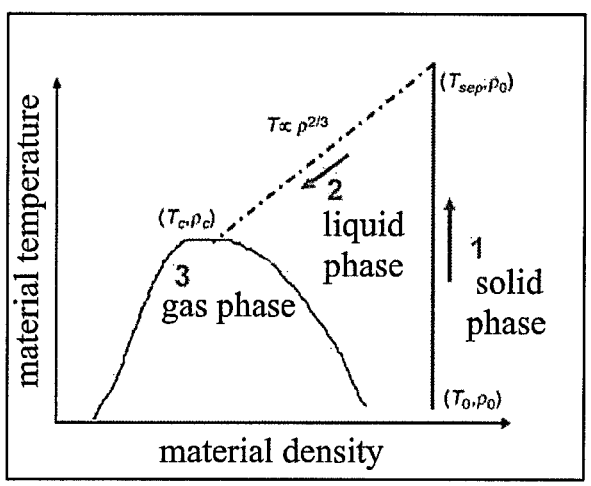
FIG. 4 is a diagram depicting three phase corresponding to a material density and a material temperature during a material process.
Figure 5:
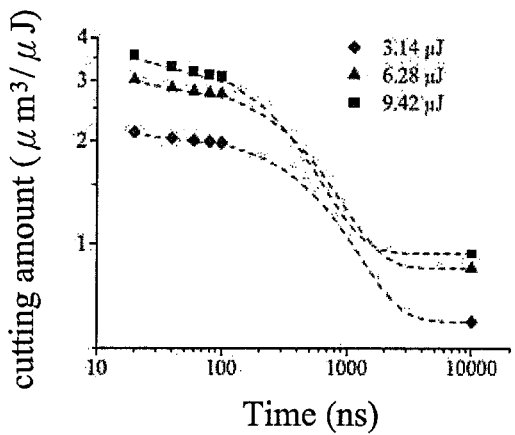
FIG. 5 is a diagram of a relationship between a long pulse time interval and a decrease in a cutting amount.
Figure 6:
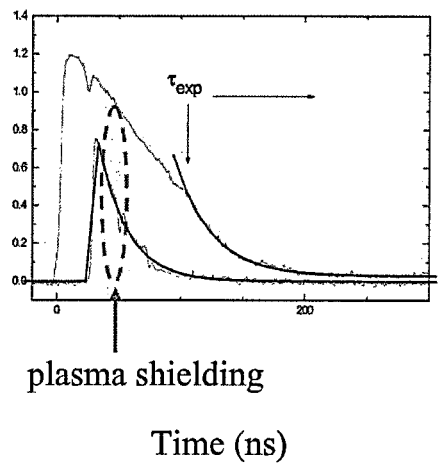
FIG. 6 is a schematic diagram of a short pulse time interval and plasma shielding generated.
Figure 10:
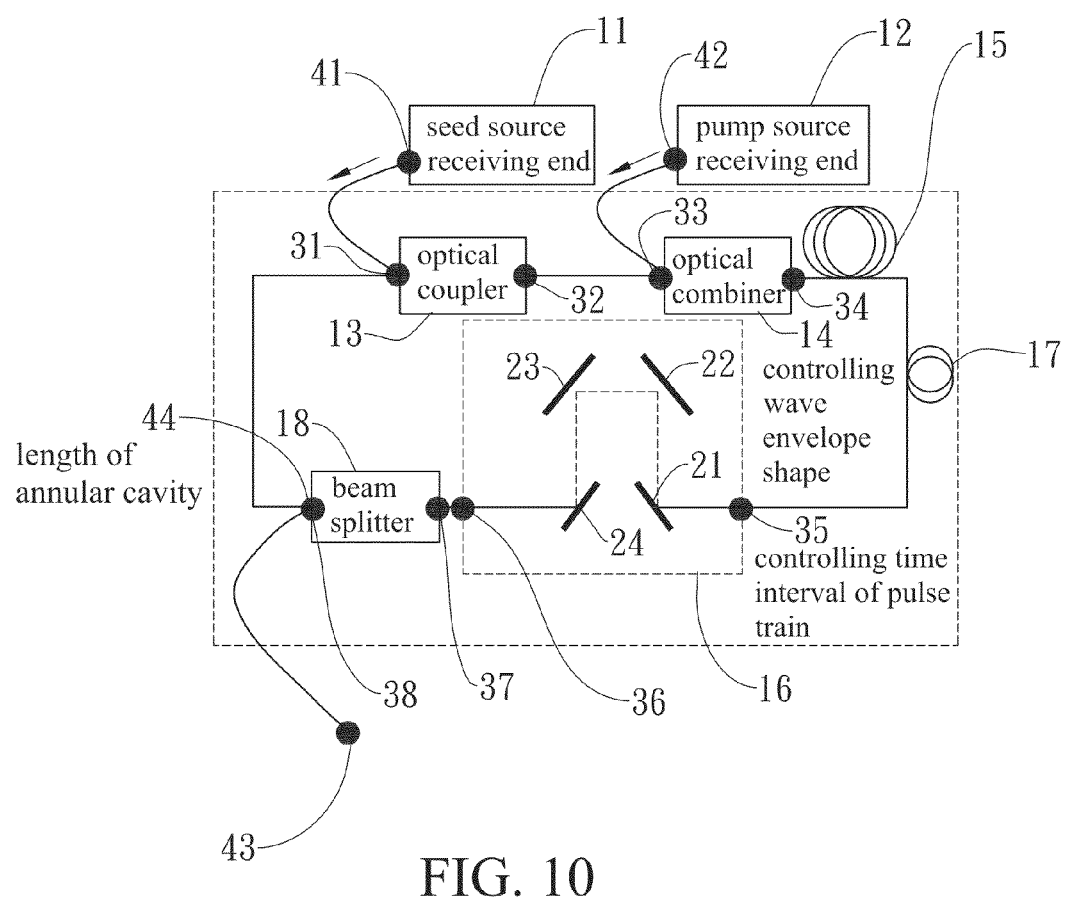
FIG. 10 is a schematic diagram of an apparatus for generating a pulse train with an adjustable time interval according to one embodiment.
Figure 10B:
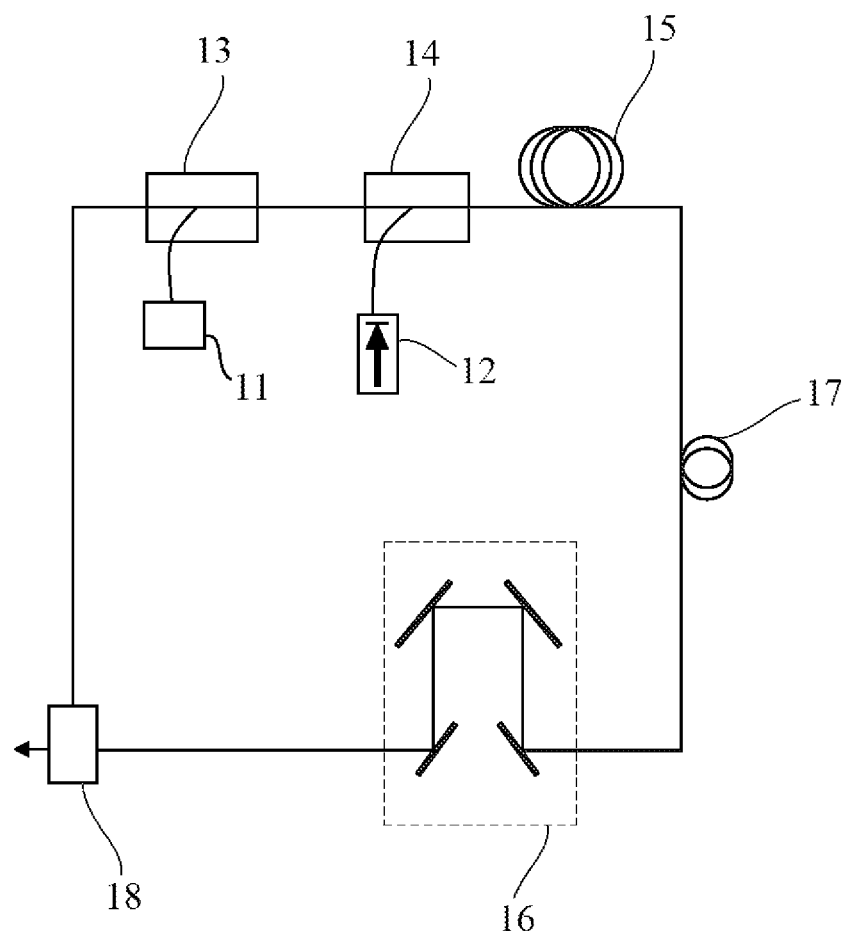
FIG. 10B is a simplified view of FIG. 10.

An apparatus for generating a pulse train with an adjustable time interval is provided by the disclosure. Referring to FIGS. 10 and 10B, by use of an optical design, a time interval of a pulse train can be arbitrary adjusted to satisfy processing requirements of various materials. Thus, with the embodiments of the disclosure, a time interval of a pulse train can be adjusted as desired to also improve quality and a speed of material processing. FIG. 2A shows a schematic diagram of picosecond laser pulse trains. In FIG. 2A, each envelope has five pulse trains. FIG. 2B shows a schematic diagram of a drilling depth of a picosecond laser with pulse train. Compared to FIG. 1B, the picosecond laser with pulse train in FIG. 2B has a greater drilling depth than that shown in FIG. 1B. FIG. 2C shows a schematic diagram of surface processing effects of a picosecond laser with pulse train. Compared to FIG. 1C, the picosecond laser with pulse train in FIG. 2C renders a preferred burr suppressing effect and preferred process quality. FIG. 3 shows a diagram of a relationship corresponding to a higher material removal rate as the number of pulse trains gets larger under a same laser pulse repetition rate.

Figure 7:
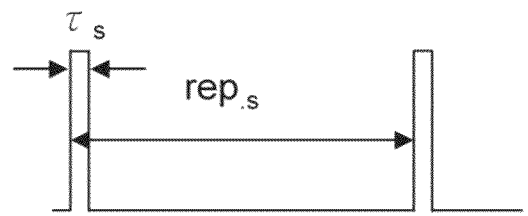
FIG. 7 is a schematic diagram of a repetition rate $rep_s$ and a pulse width $\tau_s$ of a laser seed source.
Figure 8:
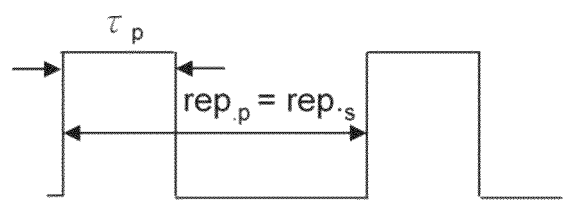
FIG. 8 is a schematic diagram of a repetition rate $rep_p$ and a pulse width $\tau_p$ of a pump source.
Figure 9:
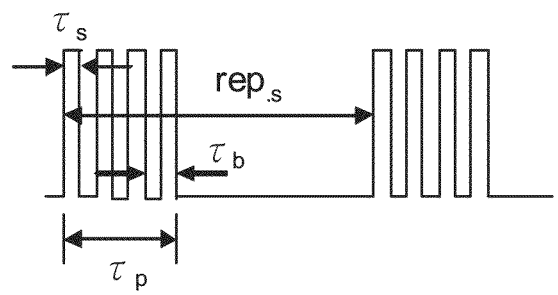
FIG. 9 is a schematic diagram of determining the number of pulse trains according to a pulse width $\tau_p$ of a pump source.

Referring to FIG. 10, an apparatus 10 for generating a pulse train with an adjustable time interval, being an annular optical cavity structure, comprises a seed source receiving end 11, a pump source receiving end 12, an optical coupler 13, an optical combiner 14, at least one gain fiber 15, an optical path time regulator 16, and a beam splitter 18. The optical coupler 13 has an input end as a first end 41 as the seed source receiving end 11 for receiving a seed source optical signal inputted, and another input end as a second end 31 for cyclically transmitting the seed source optical signal within the annular optical cavity. The optical combiner 14 has an input end as a fourth end 33 connected to an output end of the optical coupler 13 as a third end 32, and another input end as a fifth end 42 disposed on the pump source receiving end 12 and for receiving a pump source optical signal inputted. The at least one gain fiber 15 is a gain medium for amplifying a pulse train optical signal cycling within the annular optical cavity, and is located on the annular optical cavity. Further, the at least one gain fiber 15 has at least one input end connected to an output end of the optical combiner 14 as a sixth output end 34. The optical path time regulator 16 has an input end as a seventh end 35 connected to an output end of the at least one gain fiber 15, and is for adjusting the time interval of the pulse train optical signals within the annular optical cavity. The beam splitter 18 has an input end as a ninth end 37 connected to an output end of the optical path time regulator 16 as an eighth end 36, such that a part of the pulse train optical signals traveling for one cycle within the annular optical cavity are outputted from a first output end of the beam splitter 18 as a tenth end 43. Further, the beam splitter 18 has a second output end as an eleventh end 44 connected to the second end 31 (input end) of the optical coupler 13. Initial optical signals received by the seed source receiving end need to have a pulse time interval greater than the time that the same signals traveling for one cycle within the annular optical cavity. FIG. 7 shows a schematic diagram of a repetition rate $rep_s$ and a pulse width $\tau_s$ of an initial optical signal received by the seed source receiving end 11. FIG. 8 shows a schematic diagram of a repetition rate $rep_p$ and a pulse width $\tau_p$ of a pulse optical signal received by the pump source receiving end 12. Referring to FIGS. 7 and 8, the repetition rate $rep_p$ of the pump optical signal is the same as the repetition rate $rep_s$ of the initial seed source optical signal. The seed source optical signal attenuates as the number of cyclical travels within the annular optical cavity increases, and so the attenuated optical signal is amplified through the pump source optical signal and the gain fiber. The repetition rate of pulse train is determined by a length L of the annular optical cavity structure. A speed of light within the annular optical cavity is $V_c$, and hence the repetition rate of the pulse train is $rep_b = V_c/L$, the time interval of the pulse train is $\tau_b = L/V_c$, and the number of pulse trains is $N = \tau_p V_c/L$, as shown in FIG. 9.

The optical path time regulator 16 controls the optical path time of light traveling for one cycle within the annular optical cavity. For example, the optical path time regulator 16 is a plurality of free-space mirrors or a passive fiber switch. Again referring to FIG. 10, the plurality of free-space mirrors comprise a first free-space mirror 21, a second free-space mirror 22, a third free-space mirror 23, and a fourth free-space mirror 24. The first free-space mirror 21 transmits the pulse train optical signal cycling within the annular optical cavity to the first free-space mirror 21 via the seventh end 35 (input end) of the optical path time regulator 16. The second free-space mirror 22 reflects the pulse train optical signal cycling within the annular optical cavity to the second free-space mirror 22 via the first free-space mirror 21. The third free-space mirror 23 reflects the pulse train optical signal cycling within the annular optical cavity to the third free-space mirror 23 via the second free-space mirror 22. The fourth free-space mirror 24 reflects the pulse train optical signal cycling within the annular optical cavity to the fourth free-space mirror 24 via the third free-space mirror 23, and outputs the pulse train optical signal cycling within the annular optical cavity to the eighth end 36 (output end) of the optical path time regulator 16 via the fourth free-space mirror 24. The free-space mirrors are capable of adjusting reflection angles and distances between the free-space mirrors, so as to control the optical path time of light traveling for one cycle within the annular optical cavity.

Again referring to FIG. 10, the optical coupler 13 receives incident light of different wavelengths and different directions. For example, the optical coupler 13 is a wavelength division multiplexer (WDM), a combiner or a coupler. As shown in FIG. 10, the optical combiner 14 receives the seed source initial optical signal and the pump source optical signal received by the coupler 13. For example, the optical combiner 14 is a WDM or a combiner. The beam splitter 18 divides a beam into two separate beams of different proportions. For example, the beam splitter 18 is a coupler or a half-wave plate cooperating with a polarization beam splitter. The apparatus for generating a pulse train with an adjustable time interval may further comprise a polarization controller 17 for changing a wave envelope shape of the pulse train.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. An apparatus for generating a pulse train with an adjustable time interval, the apparatus being an annular optical cavity structure, the apparatus comprising:
   a seed source receiving end, for receiving an initial optical signal inputted;
   an optical coupler, having an input end serving as the seed source receiving end for receiving the seed source optical signal inputted, and another input end for cyclically transmitting the seed source optical signal within the annular optical cavity;
   an optical combiner, having an input end connected to an output end of the optical coupler, and another input end serving as a pump source receiving end for receiving a pump source optical signal inputted;
   at least one gain fiber, being a gain medium, located on the annular optical cavity structure, having at least one input end connected to an output end of the optical combiner, for amplifying a pulse train optical signal cycling within the annular optical cavity structure;
   an optical path time regulator, having an input end connected to an output end of the at least gain fiber, for adjusting the time interval between the pulse train optical signals within the annular optical cavity; and
   a beam splitter, having an input end as connected to an output end of the optical path time regulator, and a second output end connected to the input end of the optical coupler as the second end, such that a part of the seed source optical signals traveling for one cycle within the annular optical cavity are outputted via a first output end of the beam splitter;
   wherein the initial optical signal received by the seed source receiving end has a signal pulse time interval greater than a time of light travelling for one cycle within the annular optical cavity.

2. The apparatus according to claim 1, wherein the optical coupler has the input end serving as the seed source receiving end as a first end, the another input end as a second end, and the output end as a third end; the optical combiner has the input end connected to the output end of the coupler as a fourth end, the another input end as a fifth end, and the output end as a sixth end; the optical path time regulator has the input end as a seventh end, and an output end as an eighth end; the beam splitter has the input end as a ninth end, the first output end as a tenth end, and the second output end as an eleventh end.

3. The apparatus according to claim 1, wherein the optical path time regulator controls the time of light traveling for one cycle within the annular optical cavity, and is a plurality of free-space mirrors or a passive fiber switch.

4. The apparatus according to claim 3, wherein the plurality of free-space mirrors comprise:
   a first free-space mirror, for transmitting the pulse train optical signal cycling within the annular optical cavity to the first free-space mirror via the seventh end being the input end of the optical path time regulator;
   a second free-space mirror, for reflecting the pulse train optical signal cycling within the annular optical cavity to the second free-space mirror via the first free-space mirror;
   a third free-space mirror, for reflecting the pulse train optical signal cycling within the annular optical cavity to the third free-space mirror via the second free-space mirror; and
   a fourth free-space mirror, for reflecting the pulse train optical signal cycling within the annular optical cavity to the fourth free-space mirror via the third free-space mirror, and outputting the pulse train optical signal cycling within the annular optical cavity to the eighth end being the input end of the optical path time regulator via the fourth free-space mirror; and
   the free-space mirrors are capable of adjusting reflection angles and distances between the free-space mirrors to control the time of light traveling for one cycle within the annular optical cavity.

5. The apparatus according to claim 4, wherein the optical coupler receives incident light of different wavelength and different directions, and is a wavelength division multiplexer (WDM), a combiner or a coupler.

6. The apparatus according to claim 5, wherein the optical combiner receives the seed source initial optical signal and the pump source optical signal received by the coupler, and is a WDM or a combiner.

7. The apparatus according to claim 6, wherein the beam splitter splits a beam into two separate beams of different proportions, and is a coupler or a half-wave plate cooperating with a polarization beam splitter.

8. The apparatus according to claim 7, further comprising a polarization controller for changing a pulse wave envelope shape.

* * * * *